United States Patent [19]

Simpson et al.

[11] Patent Number: 5,463,422

[45] Date of Patent: Oct. 31, 1995

[54] DATA PROCESSING TECHNIQUE FOR LIMITING THE BANDWIDTH OF DATA TO BE STORED IN A BUFFER

[75] Inventors: Miles S. Simpson, San Jose; Scott A. Kimura, Saratoga; Steven L. Gibson, San Ramon, all of Calif.

[73] Assignee: Auravision Corporation, Fremont, Calif.

[21] Appl. No.: 136,621

[22] Filed: Oct. 13, 1993

[51] Int. Cl.[6] ................................................ H04N 7/26
[52] U.S. Cl. .................... 348/390; 348/392; 348/425; 348/568
[58] Field of Search ................................. 348/392, 406, 348/419, 424, 425, 552, 565, 568; H04N 7/13

[56] References Cited

U.S. PATENT DOCUMENTS

| | | | |
|---|---|---|---|
| 4,700,226 | 10/1987 | Acampora | 348/419 |
| 5,159,447 | 10/1992 | Haskell | 348/419 |

*Primary Examiner*—Howard W. Britton
*Attorney, Agent, or Firm*—Skjerven, Morrill, MacPherson, Franklin & Friel; Brian D. Ogonowsky

[57] ABSTRACT

The bandwidth capability of a full-motion video buffer is prevented from being exceeded by automatically controlling the horizontal scaling of the incoming video data and the horizontal zooming or expansion of the outgoing display data to force the bandwidth of the video data to virtually match the bandwidth capability of the video buffer. In one embodiment, this automatic control of the horizontal scaling and zooming is performed in a dynamic fashion where a detector detects the dropping of any video bits caused by the bandwidth of the incoming video data exceeding the bandwidth capability of the video buffer. Upon detection of these dropped bits, the horizontal scaling of the incoming video data is incrementally reduced (and the horizontal zooming is proportionally increased) until the bandwidth of the incoming video data is at or below the maximum bandwidth capability of the memory buffer. In this way, the video buffer cannot be overdriven and no video data is lost. This technique also applies to processing non-video data.

15 Claims, 4 Drawing Sheets

DATA PROCESSING TECHNIQUE FOR LIMITING THE BANDWIDTH OF DATA TO BE STORED IN A BUFFER

CROSS REFERENCE TO RELATED APPLICATIONS

This application is related to U.S. application Ser. No. 08/127,219, filed Sep. 27, 1993, entitled "Flexible Multiport Multiformat Burst Buffer," assigned to the present assignee and incorporated herein by reference.

FIELD OF THE INVENTION

This invention relates to data processing techniques and, in particular, to a technique for reducing the bandwidth of data to be stored in a video buffer or other data buffer.

BACKGROUND OF THE INVENTION

In a typical multi-media system, a conventional personal computer is augmented with a full-motion video card to display full-motion video in a window on its display screen along with still images, such as text, outside the video window. Such a system offers enormous potential for educational applications and other interactive applications.

A memory buffer used to buffer the full-motion video information must be large enough and have a sufficiently large bandwidth or throughput to temporarily store and then output the vast amounts of ever changing video information without allowing the pixel data to overflow. If the bandwidth of the video buffer is not adequate, pixel information will be permanently lost and the loss of pixel information will appear as perceptible glitches on the display screen. Accordingly, it is vital that these video buffers be large enough and fast enough to not be overdriven by the incoming video information or outgoing video information requirements.

One type of video buffer which has been used is a video RAM (VRAM), which is typically a dual-port device having one port used for writing video data into the memory and a separate port for serially outputting video data from the memory to the display portion of a computer.

A much less expensive RAM which may be used for a video buffer is a dynamic RAM (DRAM), which is a single port device whose single port must be used for both inputting video data and outputting video data. Accordingly, the bandwidth and cost of the DRAM is less than that of a VRAM.

To reduce the cost of any full-motion video card for use with a conventional personal computer to achieve a multi-media capability, it would be desirable to use the less expensive DRAM, and especially the smallest size DRAM which can be used and still provide a quality video image.

FIG. 1 generally illustrates a conventional personal computer display portion 10 on the right side of FIG. 1 and the pertinent components of a full-motion video card 12 on the left side of FIG. 1. This video card 12 is typically an add-on card which is inserted into the motherboard of the personal computer for augmenting its video processing capabilities.

The personal computer includes a raster-scan type display monitor 14 which may have on the order of 800×600 pixels or more. A conventional VGA frame buffer 16 is generally bit-mapped to the display monitor 14 so that the storage locations in the frame buffer 16 have a one-to-one correspondence with the pixels in the display monitor 14.

The motion video card 12 receives analog or digital motion video information from a VCR, laser disk, CD ROM, television, or any other video source. This information is then converted into the proper digital format and applied to a vertical and horizontal scaler 20. The vertical and horizontal scaler 20 is controlled by signals on a control line 22 to reduce (if desired) the effective size (width×height) of the incoming video image so that the motion video image can be displayed in a small window 23 on the display monitor 14. The original image (e.g., 640×480 pixels) is scaled down by dropping lines of pixels to reduce the vertical height and by dropping pixels along a horizontal line to reduce the horizontal width of the video image. For example, if the original video image were to be scaled down 50% alternate lines of the video image would be deleted and alternate pixels would be deleted, thus reducing both the vertical and horizontal size by one half. Such horizontal scaling by 50% effectively reduces the peak bandwidth of the video signal by about half since every other video pixel is dropped.

This scaled video data is then temporarily stored in a motion video memory buffer 24, which may be a VRAM or DRAM.

The video data from the frame buffer 16 and the full-motion video data from the memory buffer 24 are then multiplexed by multiplexer 26 so that the full-motion video data is inserted at the proper time into the video data stream for display by the display monitor 14. Providing a horizontal and vertical expander capability may be used at the output of the memory buffer 24 to increase the pixel size of the video image beyond the pixel size of the original image.

This resulting multiplexed video data stream is converted to analog by the D/A converter 28 and then applied to the display monitor 14 to display a full-motion video window 23 along with other data on the display monitor 14. Since the incoming video image was scaled down by half in each dimension, to 320×240 pixels, a full-motion video window 23 of 320×240 pixels is now present on the display monitor 14.

To ensure the video buffer 24 has sufficient bandwidth to accurately process the video data, the video buffer 24 is made large enough and fast enough to support the maximum size (worst case) video window 23 available for selection by the user. Further, since multi-media software applications programs have varying requirements for the display of data, the size and bandwidth of the buffer 24 must be selected to satisfy the most demanding needs of these application programs.

What is needed is a more flexible data processing technique which is suitable for video data and allows a user (or application program) to select any scaling factor for any size full-motion video window without concern that the bandwidth of the full-motion video buffer will be exceeded. It is desirable that such a technique enable the use of an inexpensive and relatively small size DRAM.

SUMMARY

In a preferred embodiment of the invention, the bandwidth capability of a full-motion video buffer is prevented from being exceeded by automatically controlling the horizontal scaling of the incoming video data and the horizontal zooming or expansion of the outgoing display data to force the bandwidth of the video data to virtually match the bandwidth capability of the video buffer.

In one embodiment, this automatic control of the horizontal scaling and zooming is performed in a dynamic fashion where a detector detects the dropping of any video bits caused by the bandwidth of the incoming video data exceeding the bandwidth capability of the video buffer. Upon detection of these dropped bits, the horizontal scaling of the incoming video data is incrementally reduced (and the horizontal zooming is proportionally increased) until the bandwidth of the incoming video data is at or below the maximum bandwidth capability of the video buffer. In this way, the video buffer cannot be overdriven and no video data is lost.

A zoom or expander circuit connected at the output of the full-motion video buffer expands the horizontal width of the video window by the same amount that the horizontal width was previously reduced. This maintains a constant size full-motion video window on the display screen despite the extent of automatic scaling. This horizontal zooming also reduces the bandwidth requirements of the video buffer since pixel data does not have to be read as frequently from the video buffer.

Using this technique, any size DRAM or VRAM having virtually any bandwidth may be used as the full-motion video buffer without concern that video information will be lost and result in perceived glitches on the display screen.

DETAILED DESCRIPTION OF THE PREFERRED EMBODIMENTS

Figure 1:
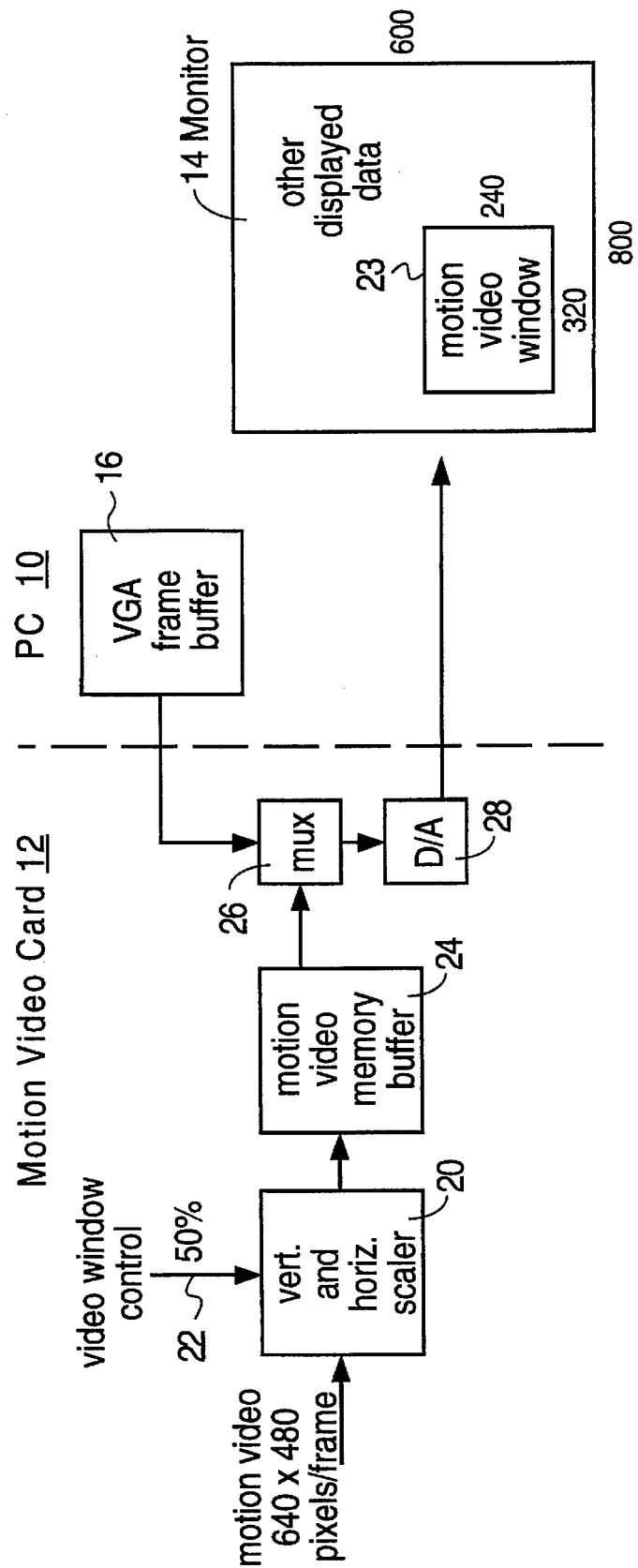
FIG. 1 is a block diagram of a conventional multi-media system using a conventional personal computer and a full-motion video card.
Figure 2:
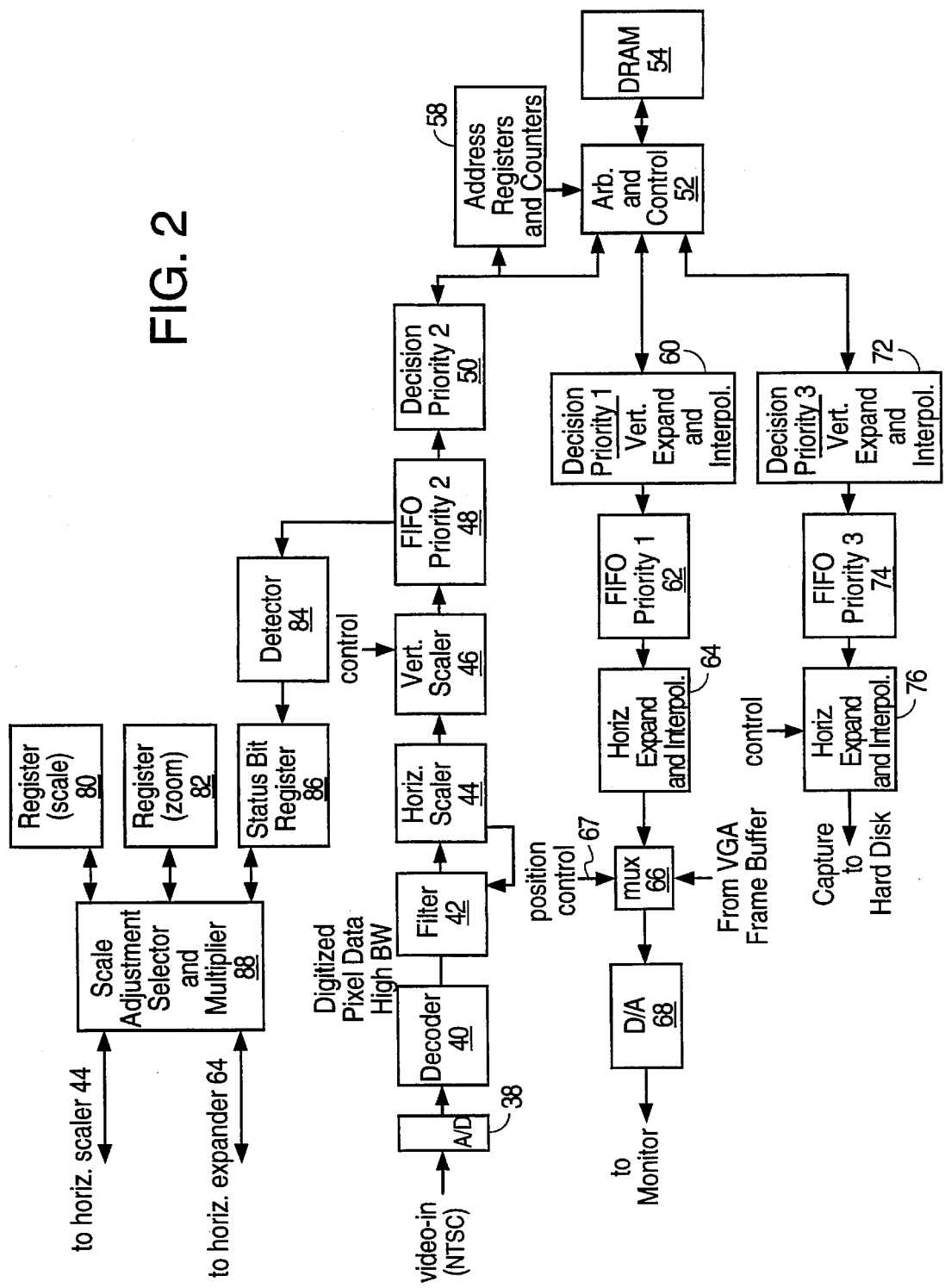
FIG. 2 is a block diagram illustrating one embodiment of the invention for automatically limiting the bandwidth of full-motion video data for storage in a video buffer.

FIG. 2 is a block diagram illustrating the preferred embodiment video processing system for processing full-motion video data for a multi-media application. Each of the functional blocks of FIG. 2 is either a conventional circuit or a circuit/software program which could be implemented by one skilled in the art using conventional techniques after reading this disclosure.

The structure of FIG. 2 is used in conjunction with a conventional personal computer to process, buffer, and display full-motion video data originating from a VCR, laser disk, CD ROM, television, or other video source. This video source may generate full-motion video information in a National Television System Committee (NTSC) format or other format. As will be explained, the digitized and processed full-motion video data is multiplexed with pixel data outputted by the computer's conventional frame buffer to simultaneously display both the conventional application software data and a window of full-motion video data. The structure of FIG. 2 may be contained on a single video card for insertion into a slot on the motherboard of a personal computer. This video card interacts with the existing VGA graphics card in the personal computer as will be further described below. In the preferred embodiment, all functional blocks shown in FIG. 2, except blocks 40, 54, 68, and 88, are implemented as a single integrated circuit.

The analog NTSC signal generated externally by a video source is converted to a digital signal by A/D converter 38 and then applied to a well-known type of decoder 40, such as a Phillips decoder part number 9051, which places the digitized signal in a selected standard format (e.g., a YUV or RGB pixel format). The selected format is dependent upon the particular display system used by the personal computer.

This now digitized full-motion video data is outputted by decoder 40 at a very high bit rate and therefore at a high bandwidth.

A controllable filter 42 effectively acts as a low pass filter to blur high frequency pixel image transitions. The output of filter 42 is connected to a horizontal scaler 44. Horizontal scaler 44 is controlled (in a manner to be described later) to periodically drop incoming pixel bits so as to effectively reduce the horizontal width of the video image and consequently reduce the bandwidth of the video data. For example, if horizontal scaler 44 were controlled to scale down the horizontal width of the image by 50%, then every other pixel would be dropped from the incoming video data. This assumes that the display is a conventional raster-scan type and the pixel data is used to energize pixels from left to right along the horizontal lines of the display.

The amount of filtering performed by filter 42 is related to the amount of scaling to be performed by horizontal scaler 44, wherein additional filtering of the incoming video signal is needed as the horizontal scaler 44 is controlled to progressively scale down the horizontal width of the video image.

The horizontal scaler 44 may be a separate circuit or may be part of a circuit which performs a variety of functions, including scaling. The horizontal scaler 44 may also be any compressor suitable for the particular type of data being transmitted.

Importantly, scaling down of the video image by dropping pixel bits causes the bandwidth of the video image data to proportionally decrease since the rate of pixel data exiting from horizontal scaler 44 is less than the rate of pixel data entering horizontal scaler 44. The horizontal scaling also reduces the required size of the full-motion video buffer (DRAM 54).

If a horizontally scaled down image were now displayed, objects would appear narrower then normal. This narrowing of the image may be corrected by horizontally zooming (or expanding) the image data after retrieval from the video buffer.

If horizontal zooming were not used to offset the horizontal scaling of the video data, the width and height proportions of the original object images may be preserved by properly controlling vertical scaler 46. Vertical scaler 46 is used to periodically delete lines of pixels, using conventional techniques, to reduce the height of the resulting raster-scan image. Although vertical scaling reduces the height, or number of lines, of the pixel image, this vertical scaling does not limit the bandwidth of the video signal since vertical scaling does not affect the peak pixel data rate. Vertical scaling does, however, reduce the number of bits to be stored per frame in the full-motion video buffer 54, thus reducing the required size of the buffer 54.

Well known filtering may also be performed by the vertical scaler 46 to ameliorate the undesirable visual effects, such as signal aliasing, resulting from dropping lines of pixels.

The pixel data exiting from vertical scaler 46 is applied to a first in-first out (FIFO) buffer 48 for temporary storage. Well known packing and synchronization circuitry are used to interface the clocking of the incoming video data with the local clocking of FIFO buffer 48. This FIFO buffer 48 and synchronization circuitry is described in detail in the copending U.S. application Ser. No. 08/127,219, entitled "Flexible Multiport Multiformat Burst Buffer," incorporated herein by reference and assigned to the present assignee. In the preferred embodiment, this FIFO buffer 48 forms only a portion of a cache memory.

A decision circuit 50 determines the amount of space available in FIFO buffer 48 for receiving additional video data. The decision circuit 50 also requests access to a DRAM 54, acting as a full-motion video buffer, to download data in the FIFO buffer 48 to prevent FIFO buffer 48 from overflowing. An arbitration and control circuit 52 determines whether the request for access should be granted, depending on the availability of the DRAM 54. Such a decision circuit and arbitration circuit are well known and will not be discussed in detail. Additional detail regarding a preferred decision circuit and arbitration circuit is discussed in the copending application Ser. No. 08/127,219, previously mentioned. Decision circuit 50 is designated priority 2, which means that a priority 1 decision circuit will override any request by decision circuit 50 for access to DRAM 54.

The control portion of circuit 52 provides addressing and timing signals to the DRAM 54 to store and retrieve video data in/from selected addresses of the DRAM 54. Address registers located in block 58 are initially loaded with the horizontal and vertical starting address of the video data to be stored in the DRAM 54 and the width and height of the video data block to be stored in the DRAM 54. Counters in block 58, starting and stopping at the predetermined addresses, are then used to sequentially address the various rows and columns in the DRAM 54 for storing the video data in a bit-mapped format. Such sequential addressing of rows and columns in a memory for storing video data is well known and will not be discussed herein in further detail.

The data path to the display monitor for displaying the stored video data will now be discussed.

A priority 1 decision circuit 60 is connected to the arbitration and control circuit 52 for requesting access to DRAM 54 when decision circuit 60 determines that FIFO buffer 62 must be refilled in order to maintain a flow of pixel data to the display. Once the request is granted, a burst of video data is outputted from DRAM 54 into FIFO buffer 62. The decision circuit 60 also includes sequential addressing circuitry which identifies the addresses in DRAM 54 which are to be accessed. The addressing means used to address this information in DRAM 54 for display is similar to the sequential addressing circuitry used to generate addresses for storing information in DRAM 54. Such addressing circuitry is conventional and will not be discussed in detail herein.

The priority 1 decision circuit's 60 request for access to DRAM 54 takes precedence over any request for access by the decision circuit 50 since the uninterrupted display of data takes priority over updating the DRAM 54 with new video data.

Decision circuit 60 also provides a vertical zoom or expander capability by accessing the same line of pixels two or more consecutive times in order to increase the height of the displayed image to be that selected by the user.

The image data in FIFO buffer 62 is outputted to a conventional unpacker and synchronization circuit for interfacing the local clocking of the FIFO buffer 62 with the display clock. These outputted pixel data bits are then applied to a horizontal expander and interpolator 64. The horizontal expander and interpolator 64 inserts pixel data, which may be interpolated data or duplicates of pixel data, to increase the horizontal width of the pixel image. Control of the horizontal expander and interpolator 64 and control of the horizontal scaler 44 will be described in greater detail later. The horizontal expander and interpolator 64 may also be any expander or decompressor suitable for the particular type of data being processed. Such an expander or decompressor may regenerate data to effectively replace the data which was eliminated by the horizontal scaler 44.

Data is outputted from the horizontal expander and interpolator 64 in accordance with a display clock and applied to a multiplexer 66. Another input to multiplexer 66 is connected to a conventional VGA graphics card for receiving the frame buffer output provided by the VGA graphics card.

At an appropriate time during the raster scanning of the display screen, the multiplexer 66 is controlled by a signal on control line 67 to pass the conventional VGA frame buffer output to the display monitor for display. When it is desired to insert the full-motion video data from DRAM 54 into the data stream to be displayed, multiplexer 66 is switched to pass the output from the horizontal expander and interpolator circuit 64 to the display monitor. The multiplexer 66 is timely controlled in such a manner that the full-motion video image appears in a substantially rectangular window on the display screen. The position and size of the window on the display screen is determined by the user of the software application program being used, such as Windows™ by Microsoft. The application program may also automatically select the size and position of the window.

The size and location of the full-motion video window on the display screen are selected and stored in a well known manner. In the preferred embodiment, the size and location of the window are identified by values stored in various registers corresponding to: the number of scan lines from the top of the screen to the beginning of the full-motion video window (i.e., the number of horizontal synchronization signals until start); a left pixel count (i.e., the number of pixels from the left of the screen to the start of the window); a right count (i.e., the number of pixels from the left of the screen to the right edge of the window); and the number of scan lines from the top of the screen to the bottom of the video window. Conventional circuitry may be used to count the horizontal sync pulses as well as the display pixel clocks to determine when to control multiplexer 66 to pass the full-motion video information only at times corresponding to the full-motion video window display times.

Additionally, in the preferred embodiment using the Windows™ program, the size and location of the full-motion video window may be programmed by the user to be represented in the VGA graphics card frame buffer as a rectangular window of a certain color (called the colorkey), such as pink. Creating this solid color window is a feature of the Windows™ program. When this solid color signal outputted from the VGA frame buffer is detected by well known circuitry, multiplexer 66 may be switched to pass the full-motion video data. This provides a redundant method for determining when to control multiplexer 66 to pass either the full-motion video data or the data from the conventional VGA frame buffer. This color-key feature may also be used to cause multiplexer 66 to pass VGA graphics data (from the VGA frame buffer) when a certain color-key in the full-motion video signal is detected. This causes the VGA graphics data to appear within selected portions of the video window.

The data outputted by multiplexer 66 is converted to an analog signal by a D/A converter 68, which is then passed to the display monitor.

Full-motion video data may also be stored on a hard disk using the priority 3 decision circuitry 72, FIFO buffer 74, and the horizontal expander and interpolator 76. Such capturing on a hard disk may occur while the full-motion video data is being displayed on a display screen. Data from DRAM 54 to be captured is accessed by decision circuitry 72 in substantially the same manner as previously described with respect to decision circuitry 60. However, decision circuitry 72 has the lowest priority, and access to DRAM 54 will only be made if decision circuitry 60 and decision circuitry 50 have not requested access. The operation of the FIFO buffer 74 and the horizontal expander and interpolator 76 is similar to that of the FIFO buffer 62 and the horizontal expander and interpolator 64, previously described.

In the preferred embodiment, each of the FIFO buffers 48, 62, and 74 described are part of a single cache memory whose storage addresses are allocated into three areas, each area being associated with one of the FIFO buffers described.

The automatic control of the horizontal scaler 44 and horizontal expander and interpolator 64 will now be described in greater detail with respect to FIGS. 2, 3 and 4. Such automatic control of the horizontal scaler 44 ensures that the bandwidth of the video data to be stored in the DRAM 54 does not exceed the bandwidth capability of the DRAM 54. As previously stated, if the bandwidth of DRAM 54 is exceeded, perceptible flaws in the video image will appear on the display screen. Automatic control of the horizontal scaler 44 may also occur if the size of the DRAM 54 is insufficient to meet the storage requirement of the video data.

Figure 3:
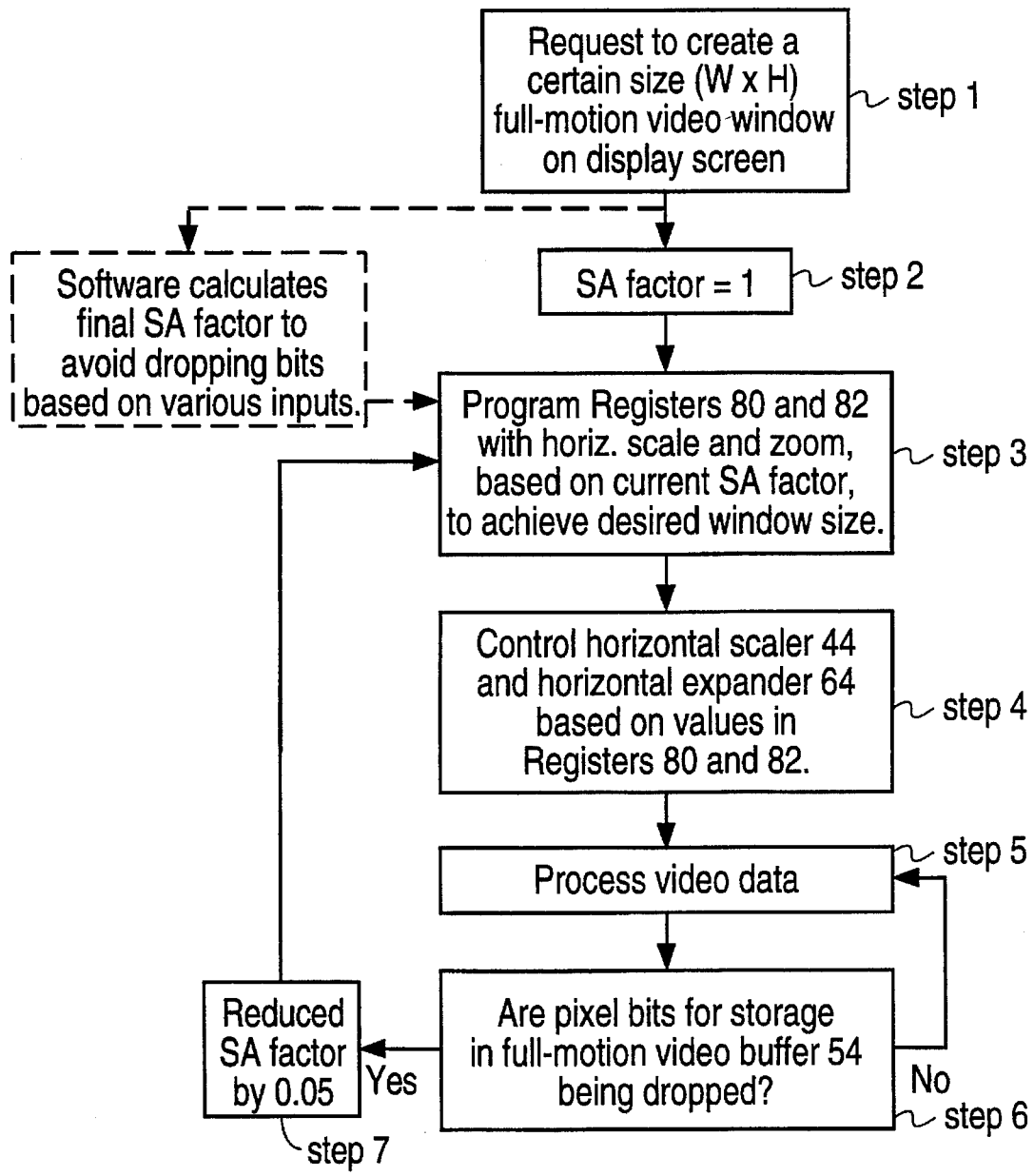
FIG. 3 is a flowchart identifying the various steps used in a preferred and alternate embodiment of the invention for limiting the bandwidth of video information.

In step 1 of the flowchart shown in FIG. 3, a user or a software application program makes a request to create a certain size (W×H) full-motion video window on the display screen. The requested size and position of the video window are stored in registers as previously described. The ability to enter this request is provided by the Windows™ program by Microsoft.

A scale adjustment factor (hereinafter referred to as an SA factor) is set to one, in step 2.

In step 3, the scaler register 80 in FIG. 2 is loaded with a 10-bit horizontal scale value between 0 and 1, corresponding to the horizontal pixel width of the requested full-motion video window. For example, if the user requested the horizontal width of the video window to be half as many pixels as the original image, the horizontal scale value loaded into register 80 will correspond to a scale of 0.5.

Also in step 3, an 11-bit value corresponding to the required horizontal expansion (or zoom) of the video data after being retrieve from DRAM 54 (FIG. 2) is loaded into the expander register 82. The value (between 0 and 1) stored in register 82 corresponds to 1/zoom factor such that the horizontal scale value in register 80 divided by the zoom value stored in register 82 is a constant corresponding to the size of the video window which will ultimately be displayed. The initial value stored in register 82 will typically be a one.

The initial horizontal scale and zoom values stored in registers 80 and 82 are multiplied by the current SA factor, which presently is one.

In step 4, the values in registers 80 and 82 are read by the scale adjustment (SA) selector and multiplier 88, and the SA selector and multiplier 88 controls the horizontal scaler 44 and horizontal expander and interpolator 64 in FIG. 2 to provide the corresponding horizontal scaling and subsequent expansion (if any) of the video data. In the preferred embodiment, the SA selector and multiplier 88 functional block is implemented in software.

In step 5, the video processing sequence is begun and incoming full-motion video data is processed through horizontal scaler 44, as previously described. The video data to be displayed is outputted via horizontal expander and interpolator 64 to a display monitor.

Although not affected by the SA factor, the vertical scaler 46 is controlled as necessary to limit the number of bits required to be stored by DRAM 54 (depending on the size of DRAM 54), and the vertical expander in the decision circuit 60 is controlled to vertically expand the image to achieve the desired height of the displayed video window. Vertical scaling does not affect the peak bandwidth of pixel data along a horizontal row of pixels. If it is determined that the size of the DRAM 54 is insufficient to store the data required, then vertical scaling in combination with horizontal scaling may be used to reduce the number of bits to be stored in DRAM 54. The vertical scaler 46 may be automatically controlled in a manner similar to that used to control horizontal scaler 44.

In step 6, a detector 84 (FIG. 2) connected to FIFO buffer 48 detects whether there is an overflow in FIFO buffer 48. If the detector 84 detects no overflow, then the bandwidth of the DRAM 54 is equal to or greater than the bandwidth of the pixel data exiting the vertical scaler 46. An indication of no overflow is provided to the status bit register 86, and the contents of the status bit register 86 are detected by the SA selector and multiplier 88. Since the contents of the status bit register 86 indicate that no bits are being discarded by FIFO buffer 48, the current SA factor of one is maintained and no changes are made to the contents of register 80 and register 82. Therefore, the horizontal scaler 44 and horizontal expander and interpolator 64 are not further adjusted.

If detector 84 detects that bits are being discarded by FIFO buffer 48 due to an overflow, the detector 84 sets a status bit in the status bit register 86. This status bit is detected by the SA selector and multiplier circuit 88 which then reduces the SA factor by 5%, or to an SA factor of 0.95. The initial horizontal scaler value is then multiplied by the present SA factor of 0.95 and loaded into register 80. The initial 1/zoom factor value is also multiplied by the current SA factor of 0.95 and then loaded into register 82. The values in registers 80 and 82 are read by the SA selector and multiplier 88, which then adjusts the horizontal scaler 44 and the horizontal expander and interpolator 64 to effectively multiply the horizontal scaling by 0.95 and to multiply the horizontal zoom by approximately 1.052 (1/0.95) so that the selected window size is held constant. In response to the scaling reduction, additional pixels will be dropped by the horizontal scaler 44 to reduce the bandwidth of the pixel data presented to the DRAM 54, and the window's reduction in scale will be compensated by the increase in horizontal zoom provided by the horizontal expander and interpolator 64. The increase in horizontal zoom further reduces the throughput demand on DRAM 54, thus freeing DRAM 54 to store additional data or provide data to the hard disk. In fact, the horizontal zooming by itself may provide the needed reduction in demand for access to the DRAM 54 to enable DRAM 54 to process the incoming data without the need for scaling. In such a case, the SA selector and multiplier 88 would only control the horizontal expander and interpolator 64 until no overflow of FIFO buffer 48 is detected.

An adjustment of the horizontal scaler 44 requires an adjustment of the filter 42 to further increase filtering as appropriate.

Steps 3, 4, 5, 6 and 7 are repeated as necessary to incrementally reduce the SA factor by 5%, thus incrementally adjusting the values in register 80 and register 82 until no pixel data is dropped by FIFO buffer 48. At this point, the resulting horizontal scaling provides a pixel data bandwidth at or below the bandwidth of the DRAM 54, and the horizontal zooming perfectly compensates for the horizontal scaling. By using this method and system, the video buffer, such as DRAM 54, need not be chosen based upon the required bandwidth and size necessary to match the worst case requirements of the system. Rather, the video buffer may now be chosen based upon the acceptable quality of the displayed image and the cost constraints of the system.

Figure 4:
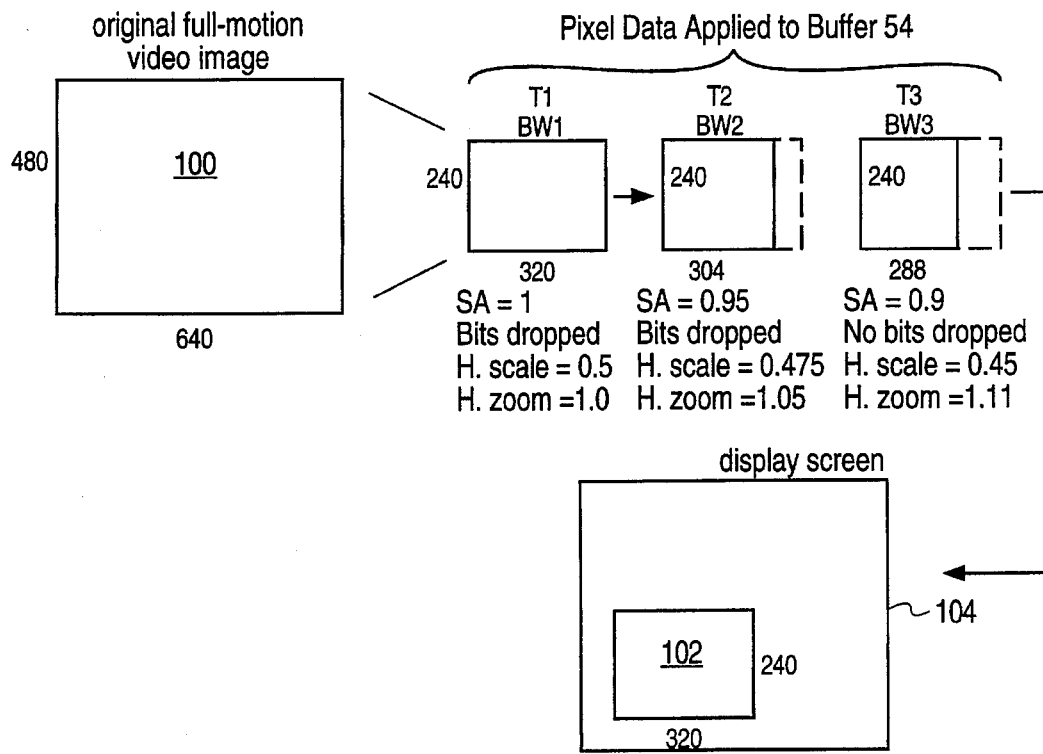
FIG. 4 provides a conceptual illustration of the inventive system's operation in limiting the bandwidth of incoming video data while maintaining the size of the displayed video window.

FIG. 4 illustrates three iterations, at times T1, T2, and T3, performed by the bandwidth reduction method of FIG. 3. The original motion video pixel data is shown in a 640×480 pixel format as pixel array 100. It is assumed that the user or the application software initially selected a full-motion video window 102 for display on the screen 104 to have half as many vertical pixels and half as many horizontal pixels as the original image so that the original horizontal scale value is 0.5. The vertical scale will also be set to 0.5. Since the vertical scaling does not affect peak bandwidth, there is no forced adjustment of the vertical scaling by the video processing technique of FIG. 3 to reduce the peak bandwidth of the video data.

The horizontal zoom will be set to 1 since, at a horizontal scale factor of 0.5, the displayed window width is as requested by the user.

In a first iteration at T1, the SA factor is 1 and the DRAM 54 will be requested to store full-motion video data corresponding to 320×240 pixels. However, at this particular horizontal scaler 44 (FIG. 2) setting of 0.5, the detector 84 detects bits being dropped by FIFO buffer 48 since the bandwidth of the scaled pixel data is greater than the bandwidth of the DRAM 54.

At time T2, the SA factor is reduced by 5% to 0.95. The initial scale and 1/zoom factor values are then multiplied by this new SA factor value and the horizontal scaler 44 is controlled to reduce the horizontal scale to 0.475, while the horizontal expander and interpolator 64 is controlled to increase the horizontal zoom proportionally by about 1.05 to maintain the same size full-motion video window on the display screen. The diagram of FIG. 4 shows in dashed outline at time T2 the amount of pixel data dropped by the decrease in horizontal scaling. The resulting pixel data being stored in DRAM 54 now consists of a pixel array equivalent of 304×240 pixels.

Assuming detector 84 still detects bits dropped from FIFO buffer 48, the SA factor is then dropped to 0.9. The initial scale and i/zoom factor values are again multiplied by this new SA factor and the horizontal scaling and horizontal zooming are adjusted accordingly.

At time T3, it is assumed that the pixel data bandwidth is sufficiently reduced to prevent FIFO buffer 48 from overflowing. The horizontal scaling has automatically been set to 0.45 and the horizontal zoom set to approximately 1.11. If the user had selected a wider video window, the resulting horizontal scaling would still have been 0.45 while the horizontal zoom would have been greater to provide the desired window size.

The automatic scaling down of the pixel data to reduce its bandwidth unavoidably lessens the resulting horizontal resolution of the displayed image. Therefore, a trade-off exists between reducing cost by using a slower and smaller DRAM 54 and still providing a high quality displayed image.

The iterative process carried out in FIG. 3 only takes a fraction of a frame and would be imperceptible to a viewer of the display.

In another embodiment, also illustrated in FIG. 3, the SA factor is not decremented in an iterative process, but instead an algorithm calculates a final Q factor value necessary to reduce the bandwidth of the incoming video signal to prevent FIFO buffer 48 from overflowing. However, this calculation requires knowledge of the frequencies of the input video clock, the display clock, and the memory clock. In some cases, the display clock frequency may not be known a priori since it is dependent upon the particular application software program being used. Also, this algorithm may be complex since the maximum SA factor value also depends upon the various characteristics of the components shown in FIG. 2. If this software algorithm is used to calculate the final SA factor, this SA factor would be inserted into the SA selector and multiplier 88 in FIG. 2, and the remainder of the operation would be identical to that previously described. In such an implementation, the detector 84 and status bit register 86 may be deleted.

The timing for the horizontal expander and interpolator 64 and downstream components in FIG. 2 is obtained from the feature connector connected to the VGA graphics card. This timing information includes the vertical synchronization, horizontal synchronization, and pixel clock.

The timing for the incoming video data portion of FIG. 2 is obtained from the incoming video source, where decoder 40 extracts the timing information. The FIFO buffer 48 timing is obtained from the DRAM memory clock, and synchronization between the incoming video data and the DRAM 54 memory clock is performed by a packing and synchronization circuit as described in the copending application Ser. No. 08/127,219, previously identified.

Figure 5:
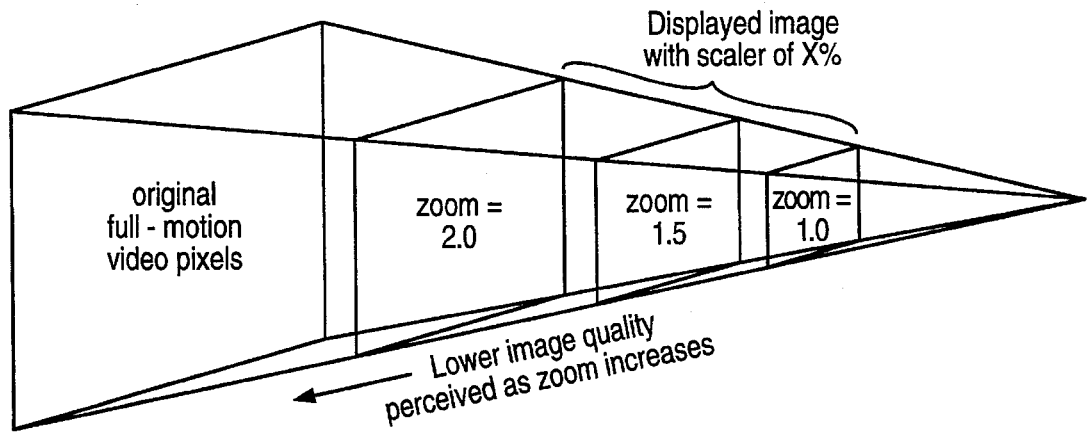
FIG. 5 provides a conceptual illustration of the expander feature of the inventive system enabling the user to select any size full-motion video window for display.

FIG. 5 illustrates the ability of the circuit of FIG. 2 to provide the user with any size video window given a final horizontal and vertical scaler value of X%. As shown in FIG. 5, as the horizontal and vertical zoom is increased to provide the user with the selected window size, a lower quality or lower resolution image appears on the video screen since pixels must be duplicated to increase the window's width and height.

This zooming capability enables the user to select a desired window size irrespective of the scaling used to reduce the bandwidth and amount of the incoming video data.

In the embodiment shown in FIG. 2, the full-motion video image being displayed may also be captured on a hard disk. Since capture by the hard disk may be stopped and started, the recording of video data may still be accurately made even if FIFO buffer 74 becomes empty while waiting for access to DRAM 54.

Captured full-motion video information may later be supplied to the input of filter 42 or to the input of FIFO buffer 48 so that the output from the hard disk now becomes the incoming video information to be displayed. Since the bandwidth of this hard disk output is presumably lower than the bandwidth of the DRAM 54, the SA factor would typically remain at 1.

Thus, an improved and flexible video processing technique has been described which allows any size and bandwidth video memory to be used as a buffer for full-motion video data without concern over glitches in the video image caused by dropped pixel data. The ability to use lower bandwidth components, including a memory and hard disk drive, results in a relatively inexpensive system. The data processing system and method described can also be used for processing certain non-video data. For non-video data, the horizontal scaling/zooming and vertical scaling/zooming described herein may be modified to be compatible with the non-video data being processed.

Additionally, an incoming video data stream need not be in a raster-scan type format in order to obtain the benefits of the present invention. For example, if the incoming data stream were in other than a raster-scan type format, the horizontal scaler 44 would be replaced with a suitable compressor for reducing the bandwidth of the data stream. Similarly, the horizontal expander and interpolator 64 may be replaced with any suitable expander for adding or regenerating data to compensate for data eliminated by the compressor.

While particular embodiment of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A video processing method comprising the steps of:
    applying pixel data having a first bandwidth to a horizontal scaler, said pixel data being for use in conjunction with a pixel array type display, said pixel data for controlling multiple rows of pixels in said display;
    determining a substantially maximum bandwidth of a data buffer for storing said pixel data;
    in response to said step of determining, controlling said horizontal scaler to reduce an amount of pixel data associated with each horizontal row of pixels in said display to reduce said first bandwidth of said pixel data to be at a second bandwidth which is at or below said maximum bandwidth of said data buffer;
    storing resulting pixel data having said second bandwidth in said data buffer for subsequent display;
    outputting pixel data from said data buffer; and
    adding pixel data to said pixel data outputted from said data buffer to compensate for the reduction of pixel data during said step of controlling said horizontal scaler.

2. The method of claim 1 wherein said step of adding pixel data maintains a desired video window size on said display despite the extent of reduction of pixel data during said step of controlling said horizontal scaler.

3. The method of claim 1 wherein said step of controlling said horizontal scaler further comprises the steps of:
    calculating a horizontal scaling factor necessary to reduce said first bandwidth of said pixel data to said second bandwidth; and
    controlling said horizontal scaler in accordance with said horizontal scaling factor.

4. The method of claim 1 further comprising the steps of applying pixel data to a vertical scaler and controlling said vertical scaler to eliminate all pixel data associated with one or more rows of pixels in said display to reduce storage requirements of said data buffer.

5. The method of claim 1 wherein said data buffer is a DRAM.

6. The method of claim 1 wherein said data buffer is a VRAM.

7. The method of claim 1 wherein said step of determining a substantially maximum bandwidth of said data buffer comprises the steps of:
    determining when a maximum bandwidth of said data buffer is exceeded by a bandwidth of said pixel data; and
    controlling said horizontal scaler to reduce an amount of pixel data to reduce said bandwidth of said pixel data until said bandwidth of said pixel data is below said maximum bandwidth of said data buffer.

8. A video processing method comprising the steps of:
    applying pixel data having a first bandwidth to a horizontal scaler, said pixel data being for use in conjunction with a pixel array type display, said pixel data for controlling multiple rows of pixels in said display;
    sequentially storing pixel data in a first-in first-out (FIFO) buffer connected between a data buffer and said horizontal scaler;
    determining when said FIFO buffer has an overflow of pixel data;
    controlling said horizontal scaler to reduce an amount of pixel data to reduce a bandwidth of said pixel data until said FIFO buffer does not overflow;
    storing resulting pixel data in said data buffer; and
    outputting pixel data from said data buffer.

9. A video processing method comprising the steps of:
    applying pixel data having a first bandwidth to a data buffer, said pixel data being for use in conjunction with a pixel array type display, said pixel data for controlling multiple rows of pixels in said display;
    determining an output bandwidth of a data buffer necessary for enabling said data buffer to store said pixel data at said first bandwidth;
    storing said pixel data having said first bandwidth in said data buffer for subsequent display;
    outputting pixel data from said data buffer at an output bandwidth; and
    in response to said step of determining, expanding said pixel data outputted from said data buffer to reduce a demand on said data buffer to output pixel data, said step of expanding pixel data causing said output bandwidth of said data buffer to be reduced to that necessary to enable said data buffer to store said pixel data at said first bandwidth.

10. The method of claim 9 wherein said step of expanding regenerates pixel data to maintain a desired video window size on said display.

11. The method of claim 9 wherein said step of determining an output bandwidth of said data buffer comprises the steps of:
    determining when an input bandwidth of said data buffer is exceeded by said first bandwidth of said pixel data; and
    regenerating additional pixel data for being displayed to reduce said demand on said data buffer until said data buffer is able to store said pixel data at said first bandwidth.

12. A data processing system comprising:
    a data source providing a data stream having a first bandwidth;
    a compressor connected to receive said data stream having said first bandwidth, said compressor being controllable to reduce a bandwidth of said data stream by reducing the number of bits in said data stream;

a data buffer connected to receive an output of said compressor for temporarily storing data outputted by said compressor, said data buffer having a maximum bandwidth for storing said data;

a first-in first-out (FIFO) buffer connected between said data buffer and said compressor;

a detector connected to said FIFO buffer to determine when said FIFO buffer has an overflow of data and, in response, providing an overflow signal to indicate that said data stream outputted by said compressor exceeds said maximum bandwidth of said data buffer; and a controller connected to said compressor, said controller, in response to said overflow signal from said detector, causing said compressor to reduce a bandwidth of said data stream by reducing the number of bits in said data stream until said bandwidth of said data stream is equal to or less than said maximum bandwidth of said data buffer.

13. The system of claim 12 wherein said controller controls said compressor in response to said detector to progressively reduce the number of bits in said data stream to progressively reduce a bandwidth of said data until said FIFO buffer does not overflow.

14. The system of claim 12 further comprising a decompressor connected to an output of said data buffer for regenerating data to compensate for the reduction of bits by said compressor when reducing said bandwidth of said data stream.

15. The system of claim 12 wherein said data comprises pixel data for use in conjunction with a pixel array type display, said pixel data for controlling multiple rows of pixels in said display, and wherein said compressor is a horizontal scaler for reducing the amount of pixel data associated with each horizontal row of pixels in said display.

* * * * *